W. C. SWIFT.
BALL BEARING.
APPLICATION FILED AUG. 25, 1909.
993,470.
Patented May 30, 1911.
2 SHEETS—SHEET 1.
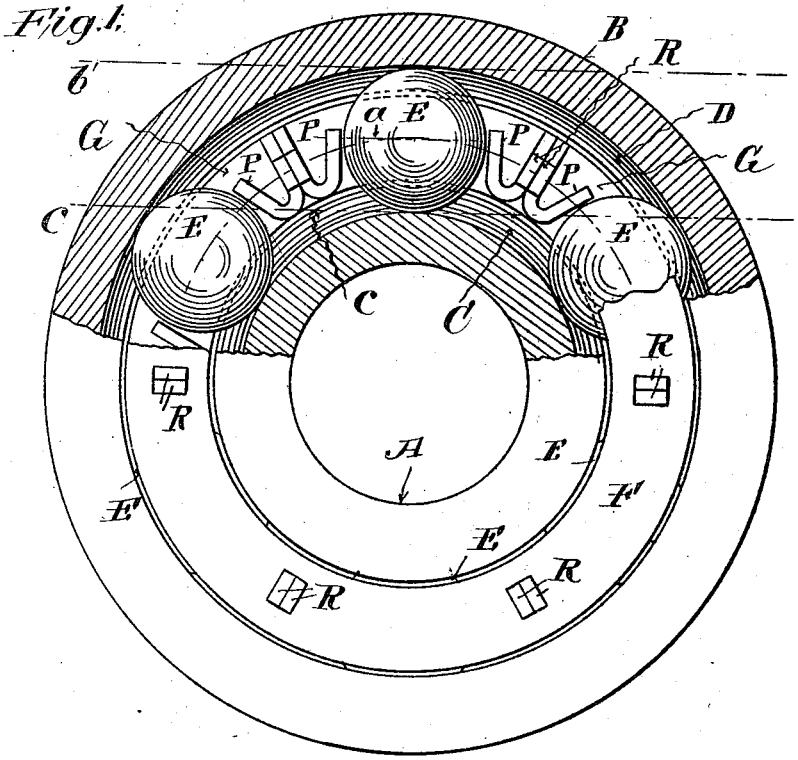
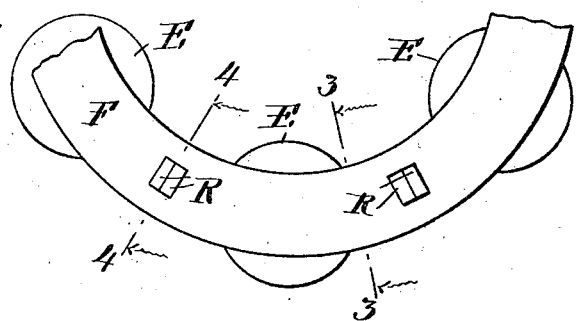
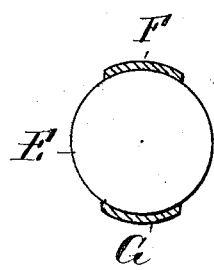
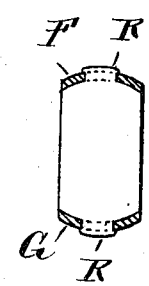
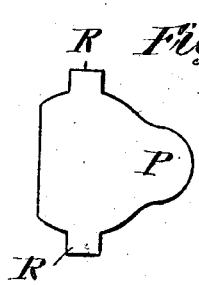

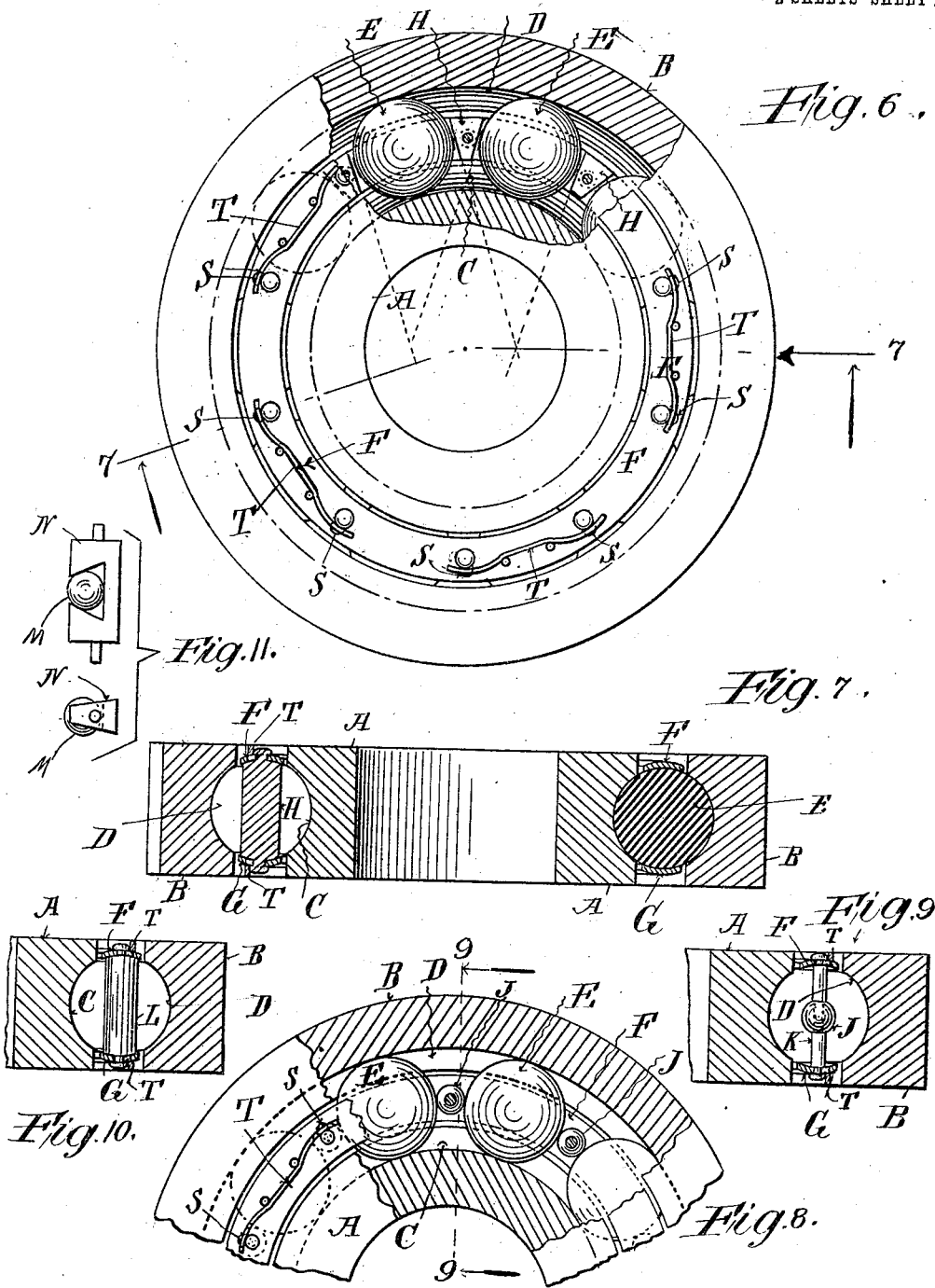

UNITED STATES PATENT OFFICE.

WILLIS C. SWIFT, OF HINSDALE, ILLINOIS.

BALL-BEARING.

993,470.

Specification of Letters Patent.

Patented May 30, 1911.

Application filed August 25, 1909. Serial No. 514,476.

*To all whom it may concern:*

Be it known that I, WILLIS C. SWIFT, a citizen of the United States, residing at Hinsdale, county of Dupage, State of Illinois, have made a certain new and useful Invention in Ball-Bearings, of which the following is a specification.

This invention relates to ball bearings.

The object of the invention is to provide a ball bearing which is simple in construction and efficient in operation, and wherein friction is eliminated to as great an extent as possible.

A further object is to provide a ball bearing construction wherein the separators for spacing the balls of the bearing are supported independently of the raceway and on the balls where there is least surface motion, and so as to afford free access of balls to contact with the separators which when balls are under load yield to the pressure of the balls and which are so positioned with respect to the balls that the points of contact respectively lie in the planes through the axes of the balls, which planes are parallel to the tangents to the balls at their points of contact with the inner and outer bearing rings, or to express the idea somewhat differently, these points of contact of any ball with the separators are directly opposite the center of the ball and lie in a line which is tangent to the ball, the point of tangency of such line being at the mid point of the periphery of the ball between its points of contact with the inner and outer bearing rings.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawing, and to the various views and reference signs appearing thereon, Figure 1 is a view in side elevation, parts broken out and parts in section showing a construction, of ball bearing embodying the principles of my invention. Fig. 2 is a detached broken detail view in elevation showing a portion of the balls and the support for the spacing separators. Fig. 3 is a view in section on the line 3, 3, Fig. 2. Fig. 4 is a view in section on the line 4, 4, Fig. 2. Fig. 5 is a detail view of a separator blank. Fig. 6 is a broken view in section showing a modified structure of spacing separator. Fig. 7 is a broken view in section on the line 7, 7, Fig. 6. Fig. 8 is a broken view, similar to Fig. 1, showing another modified arrangement embraced within the scope of my invention. Fig. 9 is a view in section on the line 9, 9, Fig. 8, looking in the direction of the arrows. Fig. 10 is a broken view in section showing still another modified construction of separator. Fig. 11 are detail views illustrating still another modified form embraced within the scope of my invention.

The same part is designated by the same reference sign wherever it occurs throughout the several views.

In the operation of ball bearings, the balls theoretically run freely in their raceway, with however, a tendency for the balls to move at different speeds along the raceway, or to relatively creep and eventually to contact with each other unless prevented from doing so. Since the proximate surfaces of adjacent balls revolve or move in opposite directions, a very objectionable friction is developed in case adjacent balls crowd together to the point of contact with each other, and hence various expedients have been resorted to in the endeavor to maintain adjacent balls separated. In one form of arrangement an intermediate or separating ball of smaller diameter is interposed between adjacent load carrying or bearing balls. This expedient, while serving to maintain the bearing balls out of contact with each other, encounters another serious difficulty, namely, being necessarily of smaller diameter than that of the bearing balls, they ordinarily engage the bearing balls at points below the mid points of the peripheries of the bearing balls between the points of contact thereof with the inner and outer bearing rings, and hence cause a very objectionable wedging action to take place whenever the bearing balls are crowded thereagainst, thereby producing an undesirable friction which might readily off-set the advantage gained by separating the bearing balls. Blocks of metal sliding in the raceways between the balls have also been employed as separators, also cages for the bearing balls, but these devices are caused to bear against or to be carried by the adjacent balls, thereby introducing an objectionable additional friction which materially decreases the efficiency of the bearing.

It is among the special purposes of my present invention to avoid the objectionable wedging action and additional friction referred to, and in carrying out my invention I employ separators between adjacent bearing balls, which separators are supported independently of the raceway, that is, the supports for the separators are arranged outside of the raceway in which the balls operate, the separators being interposed between and in such relation to the bearing balls that the points of contact of the bearing balls with the separators are always in the plane of the axis of the bearing balls, that is, said point of contact lies in a plane containing the axis of the bearing ball, which plane is parallel to the tangents through the points of contact of the bearing ball with the inner and outer bearing rings. For simplicity of expression I shall hereinafter refer to the point of contact of the balls with the separators, which is located as above defined, as lying in the tangential line at the mid point of the ball between its points of contact with the inner and outer bearing ring. In accordance with my invention and embodying a valuable feature thereof, I propose to provide for the automatic respacing of any bearing ball when the load is removed from it. This may be accomplished in many different ways, as, for instance, by employing springs acting on the separators, or slightly resilient material for the separators, such, for instance, as fiber, although soft metal might serve the purpose. Another form of arrangement well answers the purpose and in many instances, is preferable, and consists of resilient antifriction metal sheets suitably stamped out and arranged between the bearing balls.

Of course, my invention in its broadest scope, as defined in the claims, may be carried out in many specifically different ways, several of which I have shown and will hereinafter describe.

In the drawing reference signs A and B designate the parts between which the balls are to be interposed and which, for convenience, may be called the inner and the outer bearing ring respectively, these parts being provided with coöperating grooves or seats C, D, forming the raceway for the bearing balls, E. Intermediate the parts A, B, and at the sides of the raceway formed therebetween as above referred to, are rings or plates F, G, which, if desired, or necessary, may be curved in transverse section, to conform to the curvature of the bearing balls. The rings or plates F, G, carry and support the separators which are designed to be arranged intermediate the members of each pair of adjacent bearing balls. These separators may be of various forms and construction.

In Figs. 1, 2, 3, 4 and 5, I have shown an arrangement, which in many instances, I prefer to use, and wherein sheets or plates of suitable anti-friction resilient metal are stamped out and bent into proper shape to form the separators. I have found brass a suitable material to be employed in this connection. The side wings P, of the plates extend transversely of the raceway and receive the spacing contacts of the balls when, under load, or otherwise the balls are crowded thereagainst. These plates may be conveniently riveted or otherwise suitably supported at their ends upon the rings F, G, as indicated at R. It will be observed, and as indicated, that the point of contact of a ball against the wing P, of a spacer or separator plate is in the plane of the axis of the ball, indicated at $a$, which is parallel to the tangents, $b$, $c$, of the ball through the points of contact thereof with the inner and outer bearing rings respectively, that is said points of contact lie in the straight line which passes through the center of the ball, and which line is tangent to the circle through the centers of all the balls, the point of tangency being at the center of the ball, that is, in the tangential line through the axis of the ball as hereinabove defined.

In Figs. 6 and 7, I have shown the separators in the form of blocks H, of anti-friction metal or fiber which are supported at their ends, upon the rings F, G, said blocks being arranged to extend transversely across the raceway formed by the coöperating grooves or seats C, D, and intermediate adjacent bearing balls E, and in such relation thereto that the point of contact of a ball against the side of an adjacent separator lies in the tangential line through the axis of the bearing ball as hereinabove defined.

Instead of employing solid blocks for the separators against the sides of which the bearing balls contact, I may employ small separating balls J, mounted to revolve on pins K, supported at their ends in the rings or plates F, G, as shown in Figs. 8 and 9, thereby affording a rolling surface for the contact of the bearing balls.

In Fig. 10 I have shown the separator in the form of a roller L which is journaled in its ends in the side rings or plates F, G.

In Fig. 11 I have shown the separator in the form of a ball M, which is carried in a cage N, the latter being supported by the side rings F, G.

In any case, however, the points of contact of the bearing balls with the separators should be in or near the tangential lines to the circle through the axes of the bearing balls, and since the separators are supported independently of the raceway in which the balls operate, I not only reduce the friction of the bearing to a minimum, but I also avoid any derangement or displacement of the relation of the parts through wear.

By employing resilient material or a slightly yielding and springy material for the separator, it will be seen that there will be a slight resisting give in the separator when the ball is crowded thereagainst under load, and if the ball has so crept, either forward or backward from its normal position, then when it reaches a point in the raceway where it is free to be moved the separator will automatically return it to a position where it is evenly spaced with the other balls, and out of wearing contact with the separator.

In practice I prefer to provide for a movement of the hard or rotary separators relative to the rings F, G, and consequently as indicated at S, I provide the rings with elongated radial slots to receive the ends or supporting studs or pintles of the separators, and the wire springs T, to return the separators to normal position out of wearing contact with the balls and thereby properly respace the balls.

It will be observed that the separators are supported independently of the raceway, the rings F, and G, being transversely curved so as to conform to the exterior curvature of the balls and encircle the line of balls, and are supported thereon at diametrically opposite points where there is least surface motion, that is to say, at the ends of the geometric axes upon which the balls revolve, and consequently at points where there is the least friction. There being no constriction in plates F, G, the balls are free to move into or out of respacing contact with the separators.

Having now set forth the objects and purposes of my invention, and various forms of embodiment of the principles thereof, what I claim as new and useful and of my own invention and desire to secure by Letters Patent is:

1. In a ball bearing, inner and outer bearing rings having a raceway formed therebetween, bearing balls operating in said raceway, separators interposed between adjacent balls, but normally out of bearing contact therewith, and means arranged outside of the raceway and on opposite sides thereof for supporting said separators in position for the bearing balls to contact therewith at their mid points between the contacts thereof with the inner and outer bearing rings.

2. In a ball bearing, inner and outer bearing rings having a raceway therebetween, bearing balls working in said raceway, separators interposed between adjacent balls and means independent of the raceway for supporting said separators normally out of wearing contact with said balls, and in position for the balls to creep into bearing contact therewith at a single point, the point of such contact being the mid points of the balls between their points of contact with the inner and outer bearing rings.

3. In a ball bearing, inner and outer bearing rings, having a raceway therebetween, bearing balls working in said raceway, separators between but normally out of wearing contact with adjacent balls, and means independent of the raceway for supporting said separators in position to receive the contacts of the balls at a single point in the planes containing the axes of the balls, which planes are parallel to the planes tangent to the balls at their points of contact with the inner and outer bearing rings.

4. In a ball bearing, inner and outer bearing rings having a raceway therebetween, bearing balls working in said raceway, separators extending between but normally out of wearing contact with adjacent balls, and in position to receive the contacts of the balls in the planes containing the axes of the balls which planes are parallel to the planes tangent to the balls at their points of contact with the inner and outer bearing rings, and supporting rings for the separators, said rings being arrannged outside of the raceway but supported on the bearing balls.

5. In a ball bearing, inner and outer bearing rings having a raceway therebetween, bearing balls working in said raceway, separators arranged between but normally out of wearing contact with adjacent balls, and in position to receive the contacts of the balls at their mid points between the points of contact thereof with the inner and outer bearing rings, and means arranged outside of the raceway and on opposite sides thereof and supported on the bearing balls, for supporting the separators.

6. In a ball bearing, inner and outer bearing rings having a raceway therebetween, bearing balls working in said raceway, yielding separators arranged between, but normally out of wearing contact with the balls, and means for supporting the separators in position to receive the contacts of the balls solely at their mid points between the points of contacts thereof with the inner and outer bearing rings.

7. In a ball bearing, inner and outer bearing rings having a raceway therebetween, bearing balls working in said raceway, yielding separators arranged between but normally out of wearing contact with the balls, and means independent of and arranged outside the raceway for supporting said separators in position to receive the contacts of the balls solely at their mid points between their points of contact with the inner and outer bearing balls.

8. In a ball bearing, inner and outer bearing rings having a raceway therebetween, bearing balls working in said raceway, spring plates having plane surfaces extending between but normally out of wearing contact with adjacent balls, and means for supporting said plates in position to receive the contacts of the balls solely at their mid points between their points of contact with the inner and outer bearing rings.

9. In a ball bearing, inner and outer bearing rings having a raceway therebetween, bearing balls working in said raceway, spring plates having plane surfaces interposed between but normally out of wearing contact with adjacent balls, and rings arranged outside and on opposite sides of the raceway, and supported on the bearing balls, for supporting the plates in position to receive the contacts of the balls solely at their mid points between their points of contact with the inner and outer bearing rings.

10. The combination with inner and outer bearing rings having a raceway therebetween, and bearing balls working in said raceway, of yielding separators interposed between adjacent balls, but normally out of wearing contact therewith, and means supported on the balls at the ends of the axes about which they revolve for carrying said separators.

In testimony whereof I have hereunto set my hand in the presence of the subscribing witnesses, on this 29th day of July A. D. 1909.

WILLIS C. SWIFT.

Witnesses:
S. E. DARBY,
CLARENCE C. HUNICKE.

---

Copies of this patent may be obtained for five cents each, by addressing the "Commissioner of Patents, Washington, D. C."